United States Patent
Chang et al.

(10) Patent No.: US 9,588,964 B2
(45) Date of Patent: Mar. 7, 2017

(54) NATURAL LANGUAGE VOCABULARY GENERATION AND USAGE

(71) Applicant: Adobe Systems Incorporated, San Jose, CA (US)

(72) Inventors: Walter W. Chang, San Jose, CA (US); Gregg D. Wilensky, Pacific Palisades, CA (US); Lubomira A. Dontcheva, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 460 days.

(21) Appl. No.: 13/683,509

(22) Filed: Nov. 21, 2012

(65) Prior Publication Data

US 2014/0081626 A1 Mar. 20, 2014

Related U.S. Application Data

(60) Provisional application No. 61/702,629, filed on Sep. 18, 2012.

(51) Int. Cl.
*G06F 17/27* (2006.01)
*G06F 17/28* (2006.01)

(52) U.S. Cl.
CPC .......... *G06F 17/28* (2013.01); *G06F 17/2735* (2013.01); *G06F 17/2785* (2013.01); *G06F 17/2795* (2013.01)

(58) Field of Classification Search
CPC .......... G06F 17/2785; G06F 17/30705; G06F 17/3071; G06F 17/30011; G06F 17/30616; G06K 9/6224

USPC ..... 704/9, 4, 277, 257, 2; 709/206; 707/797, 707/755, 738, 737; 706/59; 345/589
See application file for complete search history.

(56) References Cited

U.S. PATENT DOCUMENTS

| | | | |
|---|---|---|---|
| 4,726,065 A | 2/1988 | Froessl | |
| 5,526,020 A | 6/1996 | Campanelli et al. | |
| 6,133,904 A * | 10/2000 | Tzirkel-Hancock | G10L 15/26 345/156 |
| 6,243,713 B1 * | 6/2001 | Nelson | G06F 17/30017 |
| 6,278,967 B1 * | 8/2001 | Akers | G06F 17/271 704/2 |
| 6,690,825 B1 | 2/2004 | Nakayama | |
| 6,970,185 B2 | 11/2005 | Halverson | |

(Continued)

OTHER PUBLICATIONS

"Non-Final Office Action", U.S. Appl. No. 13/683,466, May 9, 2014, 21 pages.

(Continued)

*Primary Examiner* — Michael Colucci
(74) *Attorney, Agent, or Firm* — Wolfe-SBMC

(57) ABSTRACT

Natural language vocabulary generation and usage techniques are described. In one or more implementations, one or more search results are mined for a domain to determine a frequency at which words occur in the one or more search results, respectively. A set of the words is selected based on the determined frequency. A sense is assigned to each of the selected set of the words that identifies a part-of-speech for a respective word. A vocabulary is then generated that includes the selected set of the words and a respective said sense, the vocabulary configured for use in natural language processing associated with the domain.

38 Claims, 9 Drawing Sheets

(56) References Cited

U.S. PATENT DOCUMENTS

| | | | |
|---|---|---|---|
| 7,493,253 B1* | 2/2009 | Ceusters | G06F 17/2775 704/10 |
| 7,539,619 B1* | 5/2009 | Seligman | G06F 17/2755 704/2 |
| 7,593,603 B1 | 9/2009 | Wilensky | |
| 7,739,597 B2 | 6/2010 | Wong et al. | |
| 7,844,458 B2 | 11/2010 | Hirota et al. | |
| 7,912,702 B2* | 3/2011 | Bennett | G06F 17/27 704/243 |
| 7,978,938 B1 | 7/2011 | Wilensky | |
| 8,117,023 B2* | 2/2012 | Funakoshi | G06F 17/2785 704/9 |
| 8,150,107 B2 | 4/2012 | Kurzweil et al. | |
| 8,218,026 B2 | 7/2012 | Oishi | |
| 8,265,925 B2* | 9/2012 | Aarskog | G06F 17/271 704/1 |
| 8,374,871 B2* | 2/2013 | Ehsani | G10L 15/193 704/257 |
| 8,380,718 B2* | 2/2013 | Gallivan | G06F 17/30616 707/738 |
| 8,442,812 B2* | 5/2013 | Ehsani | G06F 17/2775 704/231 |
| 8,589,396 B2* | 11/2013 | Achtermann | G06K 9/6222 704/9 |
| 8,619,147 B2 | 12/2013 | Kin et al. | |
| 8,630,975 B1* | 1/2014 | Guo | G06N 7/005 707/608 |
| 9,141,335 B2 | 9/2015 | Wilensky et al. | |
| 9,412,366 B2 | 8/2016 | Wilensky et al. | |
| 9,436,382 B2 | 9/2016 | Wilensky et al. | |
| 2002/0069070 A1 | 6/2002 | Boys et al. | |
| 2003/0093419 A1 | 5/2003 | Bangalore et al. | |
| 2003/0204814 A1 | 10/2003 | Elo et al. | |
| 2004/0181390 A1 | 9/2004 | Manson | |
| 2005/0080611 A1* | 4/2005 | Huang | G10L 15/197 704/4 |
| 2006/0047617 A1* | 3/2006 | Bacioiu | G06K 9/6262 706/59 |
| 2006/0155693 A1* | 7/2006 | Chowdhury | G06F 17/30675 |
| 2007/0057930 A1 | 3/2007 | Iwema et al. | |
| 2007/0179777 A1* | 8/2007 | Gupta | G06F 17/27 704/9 |
| 2007/0225969 A1 | 9/2007 | Coffman et al. | |
| 2007/0238520 A1 | 10/2007 | Kacmarcik | |
| 2008/0003547 A1 | 1/2008 | Woolfe et al. | |
| 2008/0007749 A1 | 1/2008 | Woolfe | |
| 2008/0068456 A1 | 3/2008 | Fujii et al. | |
| 2008/0252595 A1 | 10/2008 | Boillot | |
| 2009/0256947 A1 | 10/2009 | Ciurea et al. | |
| 2010/0121636 A1 | 5/2010 | Burke et al. | |
| 2010/0191773 A1* | 7/2010 | Stefik | G06Q 10/10 707/797 |
| 2010/0280829 A1 | 11/2010 | Gopi et al. | |
| 2011/0007078 A1 | 1/2011 | Cao et al. | |
| 2011/0032373 A1 | 2/2011 | Forutanpour et al. | |
| 2011/0082710 A1 | 4/2011 | Subash et al. | |
| 2011/0099157 A1 | 4/2011 | LeBeau et al. | |
| 2011/0106534 A1 | 5/2011 | Lebeau et al. | |
| 2011/0150321 A1 | 6/2011 | Cheong et al. | |
| 2011/0167064 A1* | 7/2011 | Achtermann | G06F 17/3071 707/737 |
| 2011/0246204 A1 | 10/2011 | Chen et al. | |
| 2011/0304729 A1 | 12/2011 | Arcaini et al. | |
| 2012/0022876 A1 | 1/2012 | Lebeau et al. | |
| 2012/0035932 A1 | 2/2012 | Jitkoff et al. | |
| 2012/0042022 A1* | 2/2012 | Sheth | H04L 12/588 709/206 |
| 2012/0151326 A1 | 6/2012 | Cross, Jr. et al. | |
| 2012/0166180 A1* | 6/2012 | Au | G06F 17/274 704/9 |
| 2012/0191460 A1 | 7/2012 | Ng-Thow-Hing et al. | |
| 2012/0280915 A1 | 11/2012 | Kyllonen et al. | |
| 2013/0086105 A1 | 4/2013 | Hammontree et al. | |
| 2013/0152007 A1 | 6/2013 | Costenaro et al. | |
| 2013/0283185 A1 | 10/2013 | Mock | |
| 2013/0322716 A1 | 12/2013 | Wollenweber | |
| 2014/0078075 A1 | 3/2014 | Wilensky et al. | |
| 2014/0078076 A1 | 3/2014 | Wilensky et al. | |
| 2014/0081625 A1 | 3/2014 | Wilensky et al. | |
| 2014/0082003 A1* | 3/2014 | Feldman | G06F 17/30684 707/755 |
| 2014/0082500 A1 | 3/2014 | Wilensky et al. | |
| 2014/0185862 A1 | 7/2014 | Kamath | |
| 2016/0321242 A1 | 11/2016 | Wilensky et al. | |

OTHER PUBLICATIONS

"Non-Final Office Action", U.S. Appl. No. 13/683,278, Jun. 20, 2014, 10 pages.

"Non-Final Office Action", U.S. Appl. No. 13/683,341, Aug. 19, 2014, 15 pages.

"Final Office Action", U.S. Appl. No. 13/683,466, Aug. 21, 2014, 25 pages.

"Final Office Action", U.S. Appl. No. 13/683,341, Jan. 16, 2015, 16 pages.

"Non-Final Office Action", U.S. Appl. No. 13/683,278, Feb. 13, 2015, 12 pages.

"Non-Final Office Action", U.S. Appl. No. 13/683,416, Mar. 18, 2015, 14 pages.

"Non-Final Office Action", U.S. Appl. No. 13/683,466, Dec. 1, 2014, 29 pages.

"Notice of Allowance", U.S. Appl. No. 13/683,466, May 8, 2015, 6 pages.

"Corrected Notice of Allowance", U.S. Appl. No. 13/683,466, Aug. 26, 2015, 4 pages.

"Final Office Action", U.S. Appl. No. 13/683,278, Aug. 20, 2015, 19 pages.

"Final Office Action", U.S. Appl. No. 13/683,416, Aug. 05, 2015, 15 pages.

"Non-Final Office Action", U.S. Appl. No. 13/683,341, Jul. 6, 2015, 18 pages.

"Non-Final Office Action", U.S. Appl. No. 13/683,278, Jan. 5, 2016, 11 pages.

"Non-Final Office Action", U.S. Appl. No. 13/683,416, Nov. 23, 2015, 15 pages.

"Final Office Action", U.S. Appl. No. 13/683,341, Nov. 19, 2015, 18 pages.

"Non-Final Office Action", U.S. Appl. No. 13/683,341, Mar. 22, 2016, 19 pages.

"Notice of Allowance", U.S. Appl. No. 13/683,278, May 27, 2016, 5 pages.

"Notice of Allowance", U.S. Appl. No. 13/683,416, Mar. 29, 2016, 11 pages.

"Final Office Action", U.S. Appl. No. 13/683,341, Aug. 11, 2016, 20 pages.

* cited by examiner

400

|  | Cat | Fox | Canine |
|---|---|---|---|
| Dog | 5 | 2 | 1 |
| Canine | 4 | 1 | 0 |

Fig. 4

NATURAL LANGUAGE VOCABULARY GENERATION AND USAGE

This Application claims priority under 35 U.S.C. Section 119(e) to U.S. Provisional Patent Application No. 61/702,629, filed Sep. 18, 2012, and titled "Natural Language Vocabulary Generation and Usage," the disclosure of which is hereby incorporated by reference in its entirety.

BACKGROUND

The functionality made available via image editing applications is ever increasing. For example, users may enhance, crop, composite, matte, and alter image data using a multitude of different operations.

However, the sheer number of choices of operations that are made available may make it difficult for a user to locate a particular operation of interest. This may include making the user aware of the operation and even locating functionality to initiate to operation once aware. Consequently, users may choose to forgo this functionality, which may hinder a user's experience with the applications.

SUMMARY

Natural language vocabulary generation and usage techniques are described. In one or more implementations, one or more search results are mined for a domain to determine a frequency at which words occur in the one or more search results, respectively. A set of the words is selected based on the determined frequency. A sense is assigned to each of the selected set of the words that identifies a part-of-speech for a respective word. A vocabulary is then generated that includes the selected set of the words and a respective sense, the vocabulary configured for use in natural language processing associated with the domain.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is an illustration of a chart showing example semantic distances between corresponding terms of the lexicon ontology structure of FIG. 3.

DETAILED DESCRIPTION

Overview

Natural language inputs may be used to expand the techniques via which a user may interact with an application. However, conventional techniques that were utilized to process natural language inputs could have difficulty in correctly processing natural language inputs, especially in real time, to determine a likely intent of a user from the input. This may be due at least in part on failure to correctly identify synonyms or related inputs that are not a part of a core vocabulary of the conventional system, complications due to support of a limited vocabulary, and so forth.

Natural language analysis techniques are described. In one or more implementations, these techniques may be employed to analyze words that are not included in a core vocabulary of a natural language processing system. This may include use of disambiguation and mapping functions as well as heuristics to determine a word or collocation that is likely similar to the analyzed words. For example, lexicon ontology structures may be employed that are hierarchical to determine a "semantic distance" between two terms. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
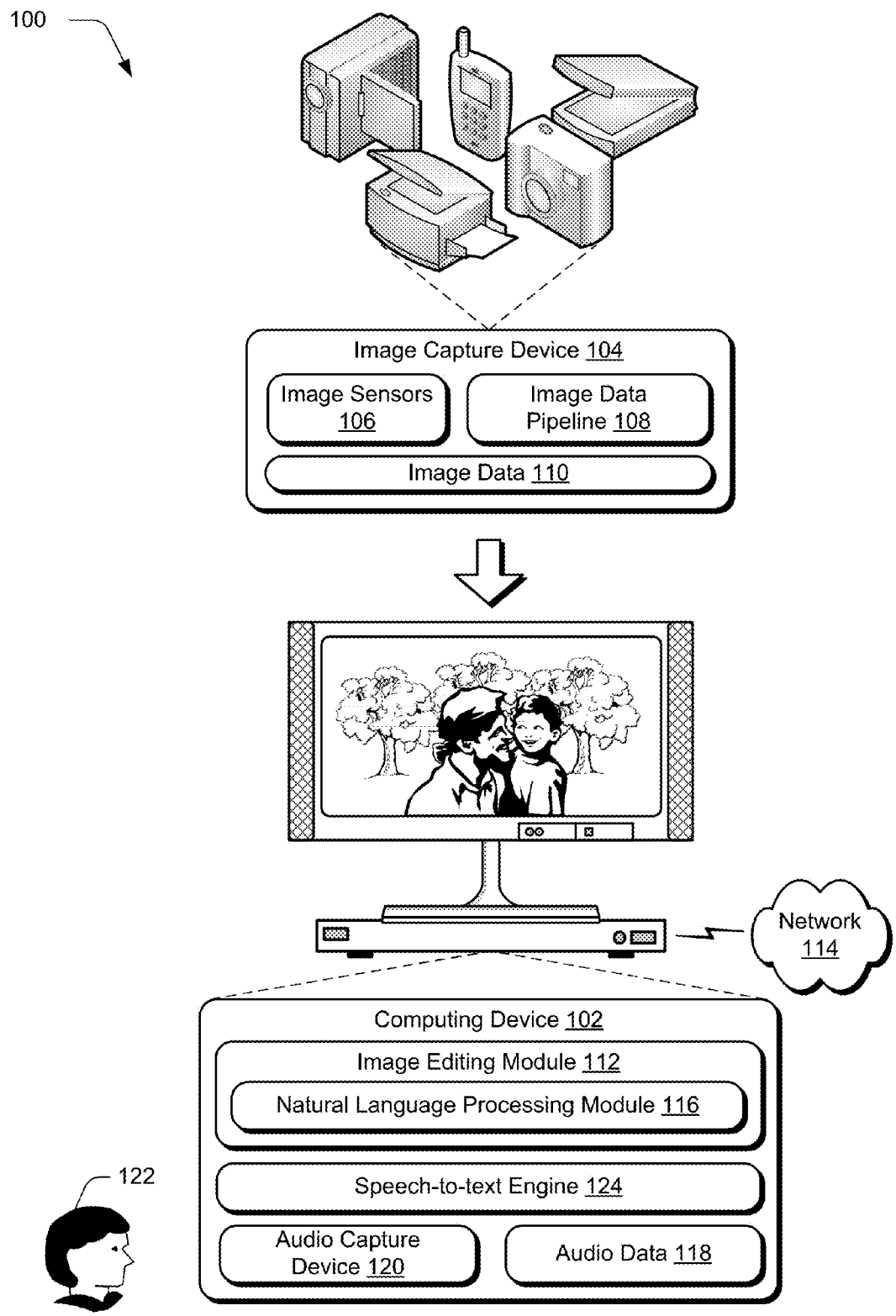
FIG. 1 is an illustration of an environment in an example implementation that is operable to employ techniques described herein relating to natural language vocabularies.

FIG. 1 is an illustration of an environment 100 in an example implementation that is operable to employ techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 9.

The image capture device 104 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device, e.g., for a tablet configuration, smart phone as illustrated, and so forth.

The image capture device 104 is illustrated as including image sensors 106 and an image data pipeline 108 that are each configured to form image data 110. For example, the image sensors 106 may be configured to capture images using a Bayer pattern or other configurations. Therefore, in this instance, the image data 110 generated by the image sensors 106 may be considered to be in a raw image format.

The image data 110 may also be processed by an image data pipeline 108 using a variety of different operations. These operations may include operations in which the image data 110 is considered to remain in a substantially raw image format. Examples of these operations include interpolation of the image data in the raw format (e.g., a Bayer pattern) into a red, green, and blue image format, de-mosaicking, and linear processing operations. The image data pipeline 108 may also perform operations in which the image data 110 is not in a raw or substantially raw image format, such as to perform gamma correction, sharpening, de-noising, or other non-linear operations. Thus, the image data 110 may be configured according to a variety of different image formats.

Further, the image data 110 is not limited to generation by an image capture device 104. The image data 110, for instance, may be generated through interaction of a user with a user interface (e.g., by drawing an image), automatically through execution of an application (e.g., a video game or other user interface), and so on. Thus, the image data 110 may also originate from a variety of different sources.

Regardless of how the image data 110 is originated, the image data 110 may then be obtained by an image editing module 112. As before, although the image editing module 112 is illustrated as being implemented on a separate device it should be readily apparent that other implementations are also contemplated in which the image sensors 106 and image editing module 112 are implemented on the same device. Further, although illustrated as being provided by a computing device 102 in a desktop configuration, a variety of other configurations are also contemplated, such as remotely over a network 114 as part of a web platform as further described in relation to FIG. 9.

The image editing module 112 is representative of functionality that is configured to process the image data 110 using one or more operations. Examples of such functionality in FIG. 1 include operations to edit the image data 110, such as to change a display characteristic of one or more pixels described by the image data 110, decompose the image data 110, composite the image data 110 (e.g., with other image data to form a new image), and so forth. However, as previously described the sheer multitude of operations that may be made available may make it difficult to interact with the image editing module 112.

Accordingly, the image editing module 112 is illustrated as including a natural language processing module 116. The natural language processing module 116 is representative of functionality to process a natural language input, such as text, audio data 118, a gesture, and so on. For example, the audio data 118 may be captured by an audio capture device 120 from a user 122. The audio data 118 may then be processed by a speech-to-text engine 124 to form a textual natural language user input. Although the speech-to-text engine 124 is illustrated as implemented on the computing device 102, functionality of the speech-to-text engine 124 may be implemented in a variety of ways, such as "over the cloud" to be accessible via the network 114. For example, processing performed for audio data 118 by the speech-to-text engine 124 that does not meet a threshold confidence score may be continued by another speech-to-text engine available via the network 114 from a web service. Other examples of a natural language input are also contemplated, such as audio data received via the network 114 (e.g., through configuration of the computing device 102 as part of a web service), text manually entered by the user 122, and so on.

As previously described natural language inputs may be used to support flexible interaction with users. However, conventional techniques to process natural language inputs may have difficulties in disambiguation of inputs to determine a user's intent. For example, phrases such as "crop the cat" or "undo the crop" may confuse conventional processing techniques.

Accordingly, the natural language processing module 116 may utilize a variety of different techniques to determine a likely intent of a user's natural language input. For example, the natural language processing module 116 may employ a set of extensible heuristics for determining a closest related or semantically similar term to a term a natural language input. This may include determining noun or verb terms (e.g., words or collocations) for disambiguating and/or mapping terms into an unambiguous and actionable vocabulary of nouns, verbs, adjectives, and adverbs across a number of diverse applications.

This may also include use of lexicon ontology structures that are hierarchical, configured to include direct acyclic graph substructures, and so on. The lexicon ontology structures may provide a basis for determining a "semantic distance" between two terms, such as by using parent or hypernym (i.e., superordinate) relationships. Further description of lexicon ontology structures may be found in relation to the discussion of FIG. 2.

The natural language processing module 116 may also be configured to address terms that are not included in a core vocabulary, thereby overcoming the "brittleness" of conventional processing techniques that cause these techniques to fail. The natural language processing module may also leverage part-of-speech (POS) tagging techniques, which may support both disambiguation and mapping functionality for nouns, verbs, adjectives, and adverbs. The module may also be trained to learn certain domain specific word/term sense bias and used to acquire and learn a core vocabulary for a new domain by analyzing documents in a selected training corpus. Further description of these and other features may be found beginning in relation to the following discussion.

Figure 2:
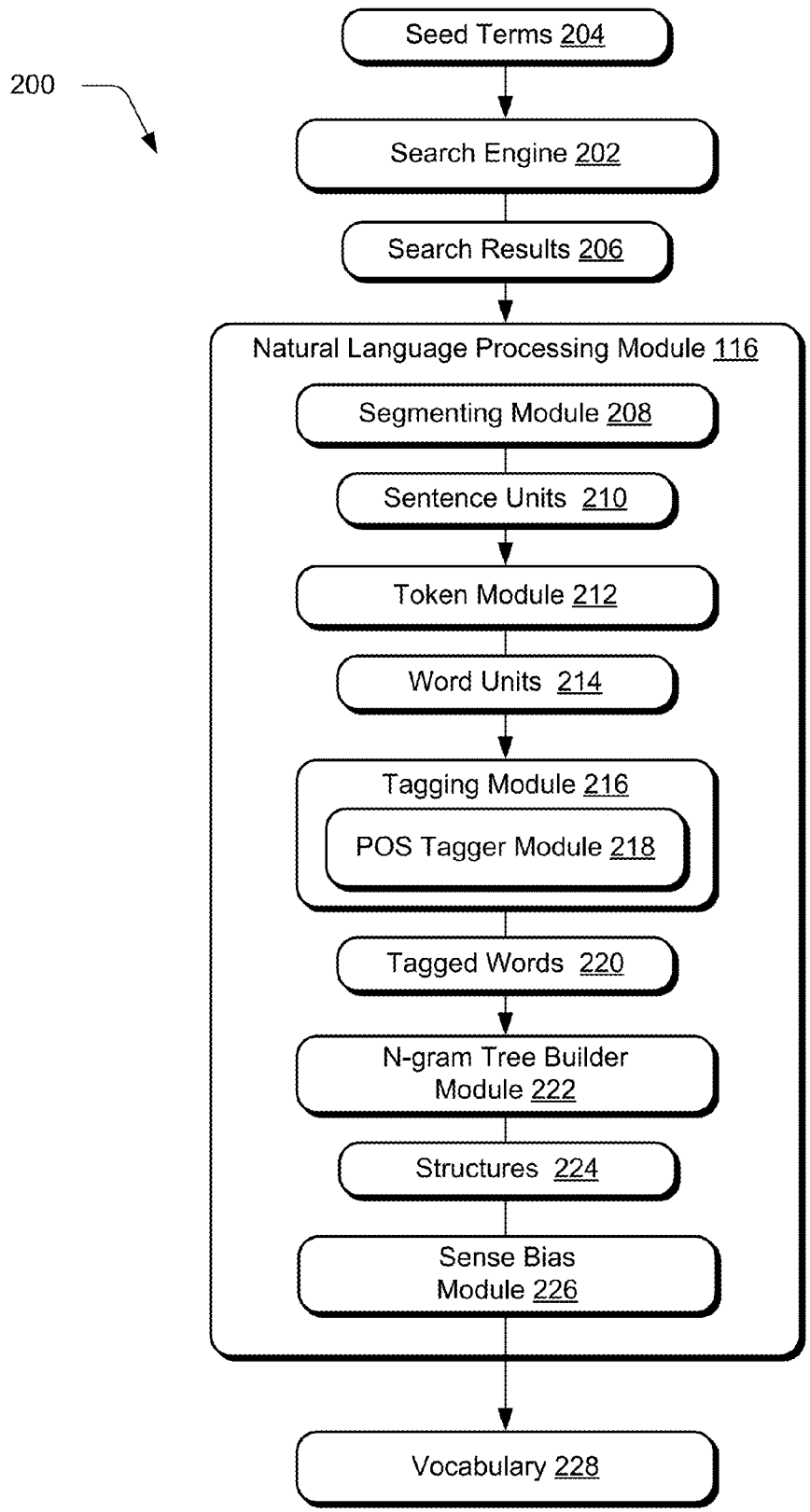
FIG. 2 depicts a system in an example implementation in which a vocabulary is generated that is biased for a particular domain.

FIG. 2 depicts a system 200 in an example implementation in which a vocabulary is generated that is biased for a particular domain. A "sense" of a word (e.g., a part-of-speech) may vary based on a domain in which the word is used. For example, the word "crop" may refer to an action in image editing and a noun in farming and horse racing. Thus, techniques are described herein in which a vocabulary may be generated that is biased for a particular domain and thereby reflects a correct sense for particular words as used in that domain.

For example, a spreading activation algorithm may be employed in which a search is seeded for a search engine 202. The search engine 202, for instance, may use seed terms 204 to example a corpus (e.g., webpages, tutorials, and so on) associated with the domain to determine which words are most frequently used in the domain. The most frequently used words may then be used in subsequent queries to locate additional words. This process may be repeated to build a set of search results 206 (e.g., pages) including the frequently used words.

In one or more implementations, techniques may be employed to constrain these searches to the particular domain. The search, for instance, may be performed using a search query in which the domain and/or words common to the domain are included as part of the search query, e.g., "image editing." In this way, the search results 206 may be kept from straying too far from the domain.

The search results 206 are then passed to a natural language processing module 116, which is illustrated as including a plurality of components, which may be incorporated as part of the module, as stand-alone modules, and so on. A first example of one such component is a segmenting module 208. The segmenting module 208 is representative of functionality to segment text of the search results 206 into individual parts, such as sentence units 210 in this example.

The sentence units 210 are then obtained by a token module 212. The token module 212 is representative of functionality to process an input (e.g., the sentence units 210 or other input) into word units 214, e.g., individual words. Thus, at this point individual words have been identified from the search results 206.

The natural language processing module 116 is further illustrated as including a tagging module 216. The tagging module 412 is representative of functionality to produce tags. For example, a part-of-speech tagger module 218 may be employed to find a part-of-speech tag for each word in the word units 214 data, such as noun, verb, adjective, adverb, and so on. Other tagging modules may also be employed, such as an expression tagger module may also be used to find lexical expression tags, such as noun-X, verb-X, and so forth. Thus, the tagging module 216 may produce an output of tagged words 220 that reference a part-of-speech, lexical expressions, and so forth.

The tagged words 218 may then be passed to an N-gram tree builder module 222. The N-gram tree builder module 222 is representative of functionality to generate structures 224 including lexical prefix and suffix trees based on the tags, e.g., noun-X, verb-X, and so on. In the lexical prefix and suffix trees, for instance, words that occur more frequently are positioned closer to a root level of the tree than other words.

The structures 224 may then be processed by a sense bias module 226, which is representative of functionality to determine and assign a "sense" (e.g., part-of-speech) to respective words in the structures 224. For example, the sense bias module 226 may leverage lexicon ontologies that are available via a network 114 such as WordNet to locate and disambiguate based on a determination of similarity of related words when input words are unknown or if multiple meanings are possible, e.g., "crop", "blur", "bat", and so on. Thus, a vocabulary 228 may be formed that describes a term sense bias as applied to a term semantic distance, which may be used to disambiguate terms according to the domain, as further described below.

Figure 3:
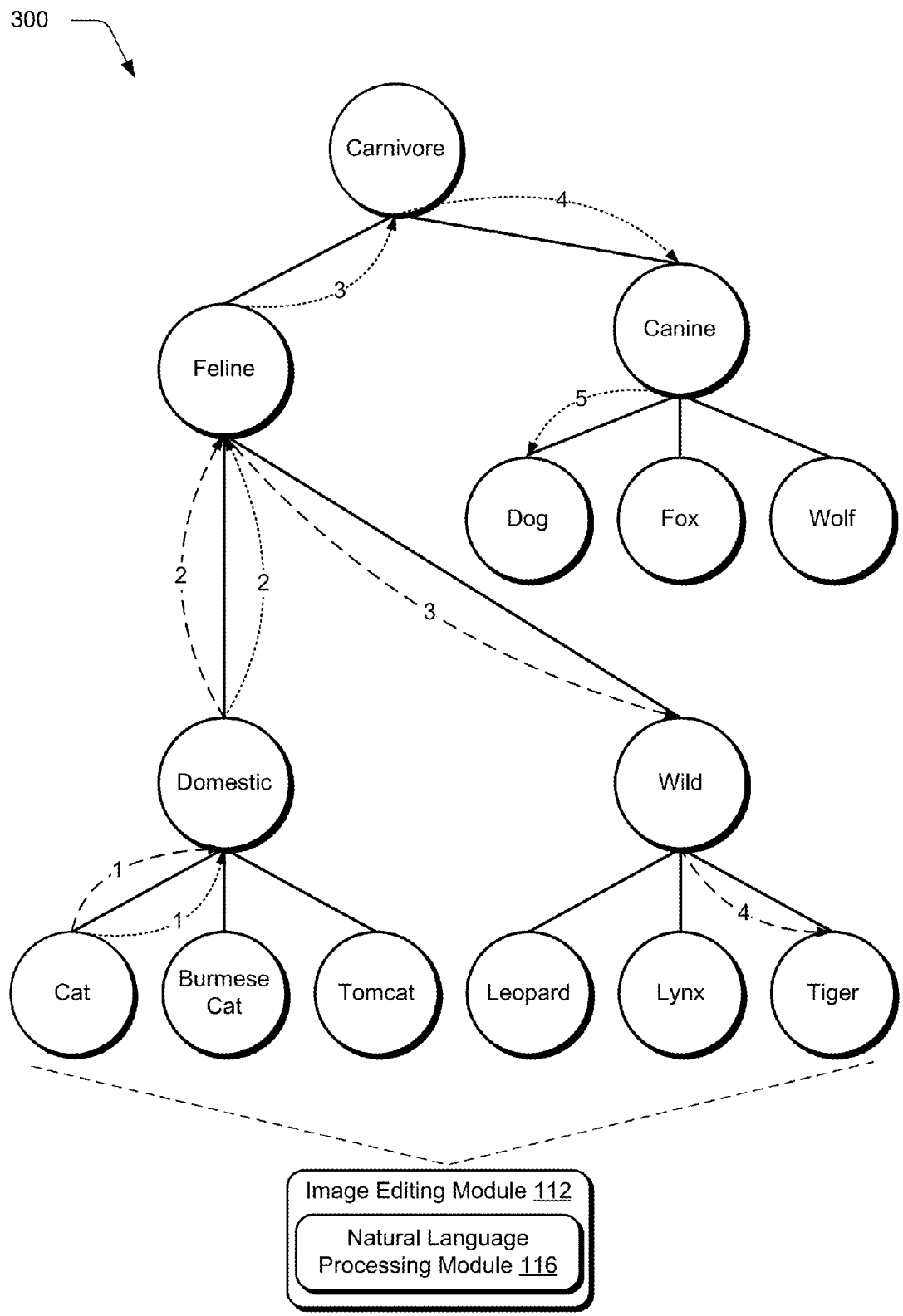
FIG. 3 depicts an example implementation of use of a lexicon ontology structure in mapping and disambiguating terms.

FIG. 3 depicts an example implementation of use of a lexicon ontology structure 300 in mapping and disambiguating terms. The natural language processing module 116 may process a natural language input to disambiguate terms based on term similarity between nouns, verbs, adjectives, and adverbs using one or more term lexicon ontologies. In one or more implementations, the natural language processing module 116 may leverage lexicon ontologies such as WordNet to locate and disambiguate based on a determination of similarity of related words when input words are unknown or if multiple meanings are possible, e.g., "crop", "blur", "bat", and so on.

For example, the natural language processing module 116 may employ a set of heuristics for determining the closest related or semantically similar noun or verb terms (either words or collocations) for term disambiguation across a number of semantic applications as previously described. This may be performed by using the heuristics to generate a term distance matrix that is maximally O(mn) for terms "T1" and "T2" with "m" and "n" senses, respectively. Further, a result set that is returned may be filtered to reduce a size of the set as further described below.

The disambiguation may be performed in a variety of ways. For example, the natural language processing module 116 may employ lexicon ontologies in mapping and disambiguating terms. These lexicon ontologies may have a hierarchical structure as illustrated in the lexicon ontology structure 300, may include direct acyclic graph substructures, and so on.

In the illustrated example, the lexicon ontology structure 300 does not include a direct acyclic graph substructure, although other examples are also contemplated. In this lexicon ontology structure 300, a semantic distance from a node "cat" to "dog" is five, as illustrated through the use of five edges shown in phantom. In another example, a semantic distance from a node "cat" to "tiger" is four, as also illustrated through use of four edges shown in phantom. Thus, a semantic distance between "cat" and "tiger" is less than a semantic distance between "cat" and "dog" and thus describes relative similarities of the terms. For instance, terms having a shorter path distance may be considered more similar than terms having a longer path distance. Thus, a semantic distance that has a lower value in comparison with other semantic distances is indicative of a greater likelihood of being similar, a further example of which is described as follows and show in a corresponding figure.

Figure 4:
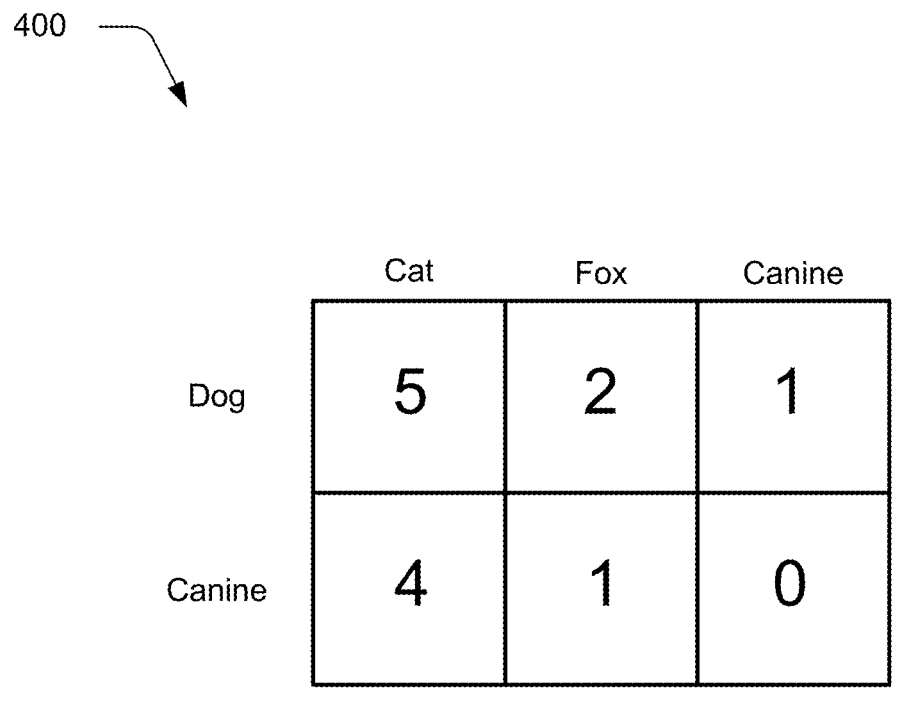

FIG. 4 is an illustration of a chart 400 showing example semantic distances between corresponding terms of the lexicon ontology structure 300 of FIG. 3. The chart 400 shows example semantic distances of the terms "dog" and "canine" with terms "cat," "fox," and "canine" respectively. For example, the semantic distance between "dog" and the terms "cat," "fox," and "canine" is illustrated as "5," "2," and "1," respectively.

Thus, as is readily apparent the semantic distances may describe a relative similarity between two terms based on a path that in the lexicon ontology structure 300 of FIG. 3 that has the fewest edges. Shorter distances (i.e., having fewer edges) are indicative of a greater likelihood of similarity than relatively longer distances. Further, as illustrated for "canine" any given term or formal synonym will have zero distance to itself.

Figure 5:
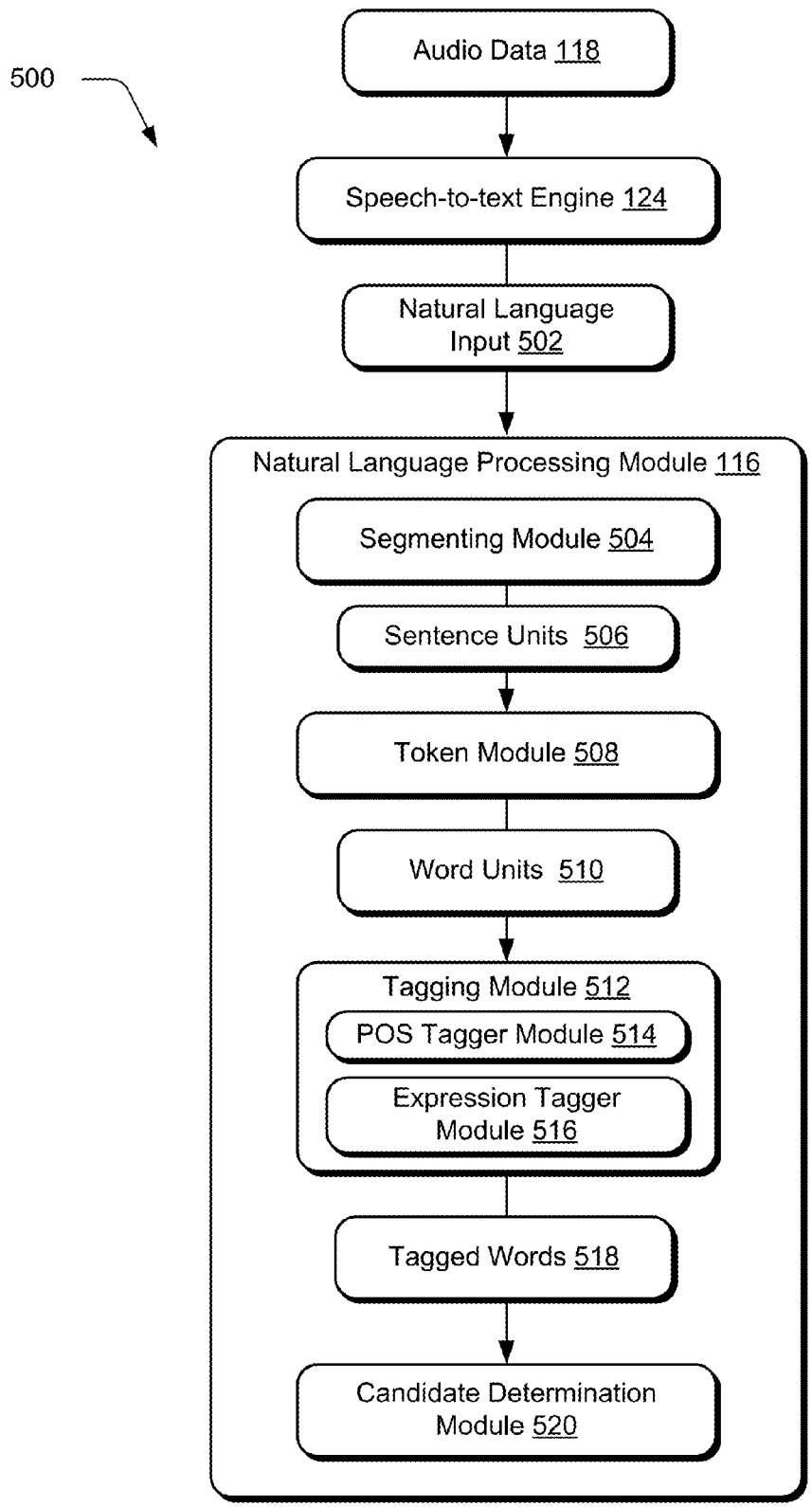
FIG. 5 depicts a system in an implementation showing an example of a natural language processing module in greater detail configured to disambiguate a natural language input using a vocabulary of FIG. 2.

FIG. 5 depicts a system 500 in an implementation showing an example of the natural language processing module 116 in greater detail configured to disambiguate a natural language input using a vocabulary 228 of FIG. 2. In the following discussion, a term may be considered a word or collocation of words, e.g., "dessert," "vanilla ice cream," and so on. A synset is a synonym ring or a group of data elements that may be considered semantically equivalent for the purposes of information retrieval. These data elements are frequently found in different metadata registries. Although a group of terms can be considered equivalent, metadata registries may store the synonyms at a central location called the preferred data element. According to lexical databases such as WordNet, a synset or synonym set is defined as a set of one or more synonyms that are interchangeable in some context without changing the truth value of the proposition in which the synonyms are embedded.

Audio data is illustrated as being received by a speech-to-text engine 124 and converted into a natural language input 502 in a textual format. Other examples are also contemplated, such as to capture text from a user interface, translation of sign language, a document, and so forth.

The natural language processing module 116 is illustrated as including a plurality of components, which may be incorporated as part of the module, as stand-alone modules, and so on. This components may be the same as or different from the components shown and described in relation to FIG. 2.

A first example of one such component is a segmenting module 504. The segmenting module 504 is representative of functionality to segment text of the natural language input 502 into individual parts, such as sentence units 506 in this example. The sentence units 506 are then obtained by a token module 508. The token module 508 is representative of functionality to process an input (e.g., the sentence units 506 or other input) into word units 510, e.g., individual words.

The natural language processing module 116 is further illustrated as including a tagging module 512. The tagging module 512 is representative of functionality to produce tags. For example, a part-of-speech tagger module 514 may be employed to find a part-of-speech tag for each word in the word units 510 data, such as noun, verb, adjective, adverb, and so on. The expression tagger module 516 may also be used to find lexical expression tags, such as noun-X, verb-X, and so forth. Thus, the tagging module 512 may produce an output of tagged words 518 that reference a part-of-speech, lexical expressions, and so forth.

The tagged words 518 may then be passed to a candidate determination module 520. The candidate determination module 520 is representative of functionality to determine a set of "best" candidates for the tagged words, further description of which may be found in the following discussion and corresponding figure.

Figure 6:
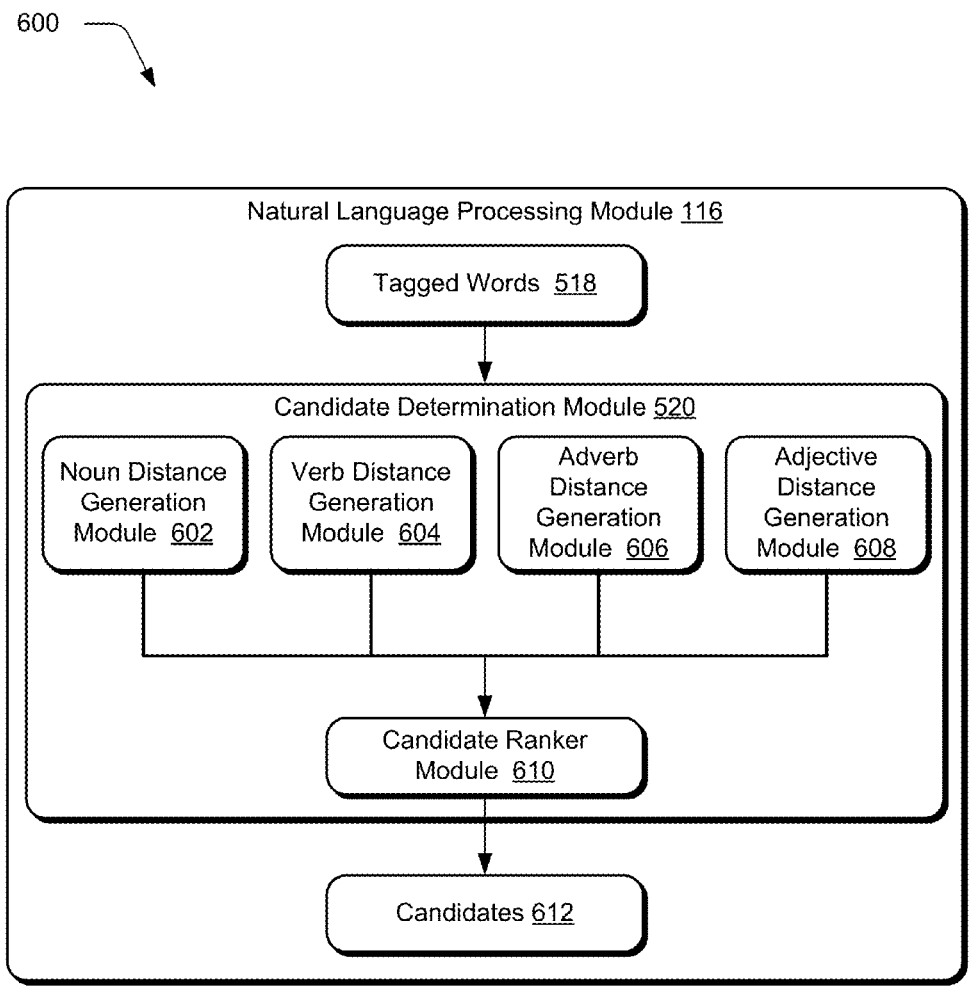
FIG. 6 depicts a system in an implementation also showing an example of the natural language processing module in greater detail.

FIG. 6 depicts a system 600 in an implementation also showing an example of the natural language processing module 116 in greater detail. This system 600 may continue from the system 500 of FIG. 5. Accordingly, the candidate determination module 520 may receive tagged words 518 for processing. This may include use of distance generation modules to determine a semantic distance between the tagged words and candidates using the vocabulary 228 of FIG. 2. Examples of such modules are illustrated as a noun distance generation module 602, verb distance generation 604, adverb distance generation module 606, and adjective distance generation module 608.

These modules may be utilized to calculate a matrix of semantic distances between terms for respective parts of speech. For example, a term distance matrix "M" may be calculated that is "n×m" for each pair of terms being disambiguated. The value "n" is a total number of lexical senses for "term1" and "m" is a total number of lexical senses for "term2."

A candidate ranker module 610 may then be used to rank candidates from the distance generation modules. For example, the candidate ranker module 610 may be used to rank a candidate meaning pair by a lowest term distance scoring metric composed of a shortest path distance and similarity of a lexical function group. Thus, candidates may be ranked by lower term distance scoring metric and used to select from a set of "best" candidates for different parts-of-speech types, e.g., noun, verb, adjective, or adverb in question. The candidate ranker module 610 may then return one or more candidates 612 that include a best matching "term2" that maps from "term1" or that best disambiguates "term1." In this way, the natural language processing module 116 may disambiguate terms in a natural language user input 502 using lexical ontologies and other functionality.

Thus, in order to perform mapping and disambiguation the natural language processing module 116 may be used to identify source noun expressions or verb expression imperatives using a part-of-speech tagger module 514. Any additional contextual grammar rules for a domain may be induced or manually added. This may be repeated for each term "It" to assign a respective POS tag.

For a source term "T1" and candidate terms "T2 . . . Tc+1," a pairwise distance matrix "M(Ti,Tj)" may then be computed for "j=2 to c+1" by the candidate determination module 420. Path distance scores may then be computed to find a closet term from a set of candidates, e.g., for nouns, verbs, adjectives, adverbs, and so on.

In one or more implementation, (Ti,Tj) pairs that involve a path that passes through an ontology root may be filtered from the set of candidates by the natural language processing module 116. This may be performed as this implies similarity at a most abstract level in the ontology. The natural language processing module 116 may also filter each instance of "Ti.1 to Ti.m" where any of the "m senses( )" of "It" yield "Ti.k" in which the "synset-element-name(Ti.k) !=synset-elementname(Ti)." Non-equal values imply "It" or "Tj" are secondary synonyms and less common synsets, i.e., the synonym value has higher likelihood of being a source term).

For the remaining (Ti,Tj) pairs with minimal distance scores, the natural language processing module 116 may generate rankings (e.g., by distance, lexname-group) where the same lexname-group for (Ti,Tj) will score higher. In the event of further ties, term "TF" values from the source corpus may be used by the natural language processing module 116. Further, corpus "TF" statistics may be biased by supervised training on documents from a target domain, e.g., annotated tutorials of the image editing module 112.

Generalization of Semantic Distance Ontology

In some instances, lexicon ontology structures may not be available, such as in the case of WordNet, distance graphs for adjective or adverb synsets are not available. In these instances, a semantic distance graph may be pre-computed and a query interface provided. In this way, the graph may again be traversed to compute minimum path distances. For example, semantic relationships may be enumerated between each synset in a graph and respective one or more parent synsets. Direct acyclic graph (DAG) substructures may also be utilized as previously described.

These hypernym relationships may then be represented using subject-predicate-object (SPO) triples. The list of SPO triples is then processed to form a direct acyclic graph structure that represents the supertype/subtype hierarchy for the lexicon. The direct acyclic graph structure may use nodes for each synset. Edges between any node and a corresponding parent may be directional to simplify traversals.

For minimum path distance operations, each of the paths from the candidate term synsets to the root node is enumerated. Each path enumerate forms a hypernym inference chain, with a set of each possible inference chains to the root defining a transitive closure of term "T" in the direct acyclic graph.

To determine a minimum path distance between any two terms (Ti,Tj), list element-wise comparisons may be used to determine a common prefix sub-list. The common prefix sub-list is assigned length "k," e.g., the position of the last common element. The shortest path distance between terms "Ti" and "Tj" can then be computed as "len(inf-chain(T1))+len(inf-chain(T2))−2k." For any collection of "m" terms being coordinated, the group minimum path distance may be expressed as "SUM(len(inf-chain(Ti)))−mk." Thus, in this example an efficient representation of a semantic distance graph may be computed and used to compute minimum path distances in instances in which a lexicon ontology structure is not available.

Disambiguating Adjectives within Imperatives

As an example, a user or document may use adjectives to describe noun objects or to specify the goal of a user operation that seeks to attain a specific result. However, an entirety of an input vocabulary may not be known to a corresponding application that is to receive the natural language input. Accordingly, in one or more implementations unknown terms may be mapped to a known vocabulary by finding the candidate terms in the known vocabulary that are the most similar to an unknown term. For example, if a user's input is "Make the image lighter" and the word "lighter" is not known, a distance matrix may be computed between the unknown term and each term in the known vocabulary 228 to locate the best mapping.

For instance, assume that the application's known vocabulary is:

(sharper, blurred, bright)

The possible pairings between "lighter" and the known terms are:

(lighter, sharper)
(lighter, blurred)
(lighter, brighter)

The output of the computed distance matrix for these pairs may then be described as follows, for "lighter.a:"

s#1 light.a.01: of comparatively little physical weight or density
s#2 light.a.02: (used of color) having a relatively small amount of coloring agent
s#3 light.a.03: of the military or industry; using (or being) relatively small or light
s#4 light.a.04: not great in degree or quantity or number
s#5 light.a.05: psychologically light; especially free from sadness or troubles
s#6 light.a.06: characterized by or emitting light
s#7 unaccented.s.02: (used of vowels or syllables) pronounced with little or no stress
s#8 light.s.08: easily assimilated in the alimentary canal; not rich or heavily seasoned
s#9 light.s.09: (used of soil) loose and large-grained in consistency
s#10 clean.s.03: (of sound or color) free from anything that dulls or dims
s#11 light.s.11: moving easily and quickly; nimble
s#12 light.s.12: demanding little effort; not burdensome with "TERM2=sharper.a," "minR=(2.0, 1, 10)," and "[0] (2.0, 1, 10)."

Values for "lighter.a" in the x axis are computed against corresponding values of "sharper.a" in the y axis as shown in the following graph:

| | s# 1 | s# 2 | s# 3 | s# 4 | s# 5 | s# 6 | s# 7 | s# 8 | s# 9 |
|---|---|---|---|---|---|---|---|---|---|
| s# 1 | 7 | 8 | 99 | 99 | 8 | 6 | 8 | 8 | 7 |
| s# 2 | 6 | 7 | 99 | 99 | 9 | 6 | 8 | 7 | 7 |
| s# 3 | 6 | 8 | 99 | 99 | 8 | 7 | 7 | 9 | 7 |
| s# 4 | 7 | 8 | 99 | 99 | 8 | 6 | 7 | 7 | 9 |
| s# 5 | 7 | 8 | 99 | 99 | 7 | 7 | 8 | 7 | 7 |
| s# 6 | 6 | 7 | 99 | 99 | 9 | 6 | 5 | 7 | 7 |
| s# 7 | 8 | 9 | 99 | 99 | 9 | 8 | 10 | 9 | 9 |
| s# 8 | 7 | 7 | 99 | 99 | 7 | 6 | 8 | 8 | 7 |
| s# 9 | 6 | 7 | 99 | 99 | 9 | 6 | 8 | 7 | 7 |
| s# 10 | 6 | 7 | 99 | 99 | 7 | 6 | >3 | 6 | 7 |
| s# 11 | 8 | 9 | 99 | 99 | 8 | 8 | 7 | 8 | 9 |
| s# 12 | 7 | 8 | 99 | 99 | 8 | 7 | 8 | 8 | 7 |

For the value of "sharper.a," the following is described:
s#1 crisp.s.01: (of something seen or heard) clearly defined
s#2 acuate.s.01: ending in a sharp point
s#3 acute.s.03: having or demonstrating ability to recognize or draw fine distinctions
s#4 astute.s.01: marked by practical hardheaded intelligence
s#5 sharp.s.05: harsh
s#6 shrill.s.01: having or emitting a high-pitched and sharp tone or tones
s#7 abrupt.s.03: extremely steep
s#8 sharp.a.08: keenly and painfully felt; as if caused by a sharp edge or point
s#9 sharp.a.09: having or made by a thin edge or sharp point; suitable for cutting or s#10 sharp.a.10: (of a musical note) raised in pitch by one chromatic semitone
s#11 sharp.s.11: very sudden and in great amount or degree
s#12 sharp.s.12: quick and forceful For "TERM2=blurred.a", the following may be described in this example:
minR=(4.0, 1, 10);
[0], (4.0, 1, 10);
[1], (5.0, 1, 6);
[2], (5.0, 1, 6); and
[3], (5.0, 2, 10).

Values for "lighter.a" in the x axis are computed against corresponding values of "blurred.a" in the y axis as shown in the following graph:

| | s# 1 | s# 2 | s# 3 | s# 4 | s# 5 | s# 6 | s# 7 | s# 8 | s# 9 |
|---|---|---|---|---|---|---|---|---|---|
| s# 1 | 7 | 7 | 99 | 99 | 7 | >5.0 | 7 | 6 | 7 |
| s# 2 | 8 | 9 | 99 | 99 | 9 | 8 | 8 | 9 | 8 |

For "blurred.a" the following is described:
s#1 bleary.s.02: indistinct or hazy in outline; and
s#2 blurred.s.02: unclear inform or expression.

For "TERM2=brighter.a", the following may be described in this example:
minR=(0.0, 4, 6);
[0], (0, 4, 6);
[1], (2.0, 1, 6);

[2], (2.0, 2, 6); and
[3], (2.0, 5, 6).

Values for "lighter.a" in the x axis are computed against corresponding values of "brighter.a" in the y axis as shown in the following graph:

|       | s# 1 | s# 2 | s# 3 | s# 4 | s# 5 | s# 6 | s# 7 | s# 8 | s# 9 |
|-------|------|------|------|------|------|------|------|------|------|
| s# 1  | 3    | 5    | 99   | 99   | 8    | >2.0 | 8    | 6    | 4    |
| s# 2  | 5    | 3    | 99   | 99   | 8    | >2.0 | 7    | 6    | 6    |
| s# 3  | 8    | 7    | 99   | 99   | 7    | 5    | 7    | 9    | 9    |
| s# 4  | 3    | 5    | 99   | 99   | 8    | >>0.0| 8    | 6    | 4    |
| s# 5  | 3    | 6    | 99   | 99   | 8    | >2.0 | 8    | 6    | 4    |
| s# 6  | 8    | 8    | 99   | 99   | 7    | 7    | 8    | 7    | 9    |
| s# 7  | 3    | 6    | 99   | 99   | 8    | >2.0 | 8    | 6    | 4    |
| s# 8  | 6    | 5    | 99   | 99   | 8    | 3    | 6    | 8    | 7    |
| s# 9  | 7    | 8    | 99   | 99   | 4    | 7    | 8    | 8    | 8    |
| s# 10 | 7    | 8    | 99   | 99   | 6    | 5    | 7    | 7    | 7    |

For the value of "brighter.a," the following is described:

s#1 bright.a.01: emitting or reflecting light readily or in large amounts
s#2 bright.s.02: having striking color
s#3 bright.s.03: characterized by quickness and ease in learning
s#4 bright.s.04: having lots of light either natural or artificial
s#5 bright.s.05: made smooth and bright by or as if by rubbing; reflecting a sheen or s#6 bright.s.06: splendid
s#7 undimmed.a.01: not made dim or less bright
s#8 bright.s.08: clear and sharp and ringing
s#9 bright.s.09: characterized by happiness or gladness
s#10 bright.s.10: full or promise By inspection of each matrix, the entry with the lowest score in this example corresponds to the term pair, e.g., lighter (sense 6) and brighter (sense 4)=0.0 as shown above.

In the following example, the lowest scoring candidate values are computed by implementation of one or more of the previously described modules as part of a web service using a sparse matrix representations, a result of which is returned to computing device.

```
RESULT[01]
{
    "dist": 0.0,
    "matrixNum": 1,
    "matrixSenseCol": 4,
    "matrixSenseRow": 6,
    "term1": "lighter.a",
    "term1_lexname": "adj.all",
    "term1_synset": "light.a.06",
    "term2": "brighter.a",
    "term2_lexname": "adj.all",
    "term2_synset": "bright.s.04"
}
RESULT [02]:
{
    "dist": 2.0,
    "matrixNum": 2,
    "matrixSenseCol": 1,
    "matrixSenseRow": 10,
    "term1": "lighter.a",
    "term1_lexname": "adj.all"
    "term1_synset": "clean.s.03",
    "term2": "sharper.a",
    "term2_lexname": "adj.all",
    "term2_synset": "crisp.s.01"
}
RESULT [03]:
{
    "dist": 4.0,
    "matrixNum": 3,
    "matrixSenseCol": 1,
    "matrixSenseRow": 10,
    "term1": "lighter.a",
    "term1_lexname": "adj.all",
    "term1_synset": "clean.s.03",
    "term2": "blurred.a",
    "term2_lexname": "adj.all",
    "term2_synset": "bleary.s.02"
}
RESULT [04]:
{
    "dist": 4.0,
    "matrixNum": 2,
    "matrixSenseCol": 8,
    "matrixSenseRow": 10,
    "term1": "lighter.a",
    "term1_lexname": "adj.all",
    "term1_synset": "clean.s.03",
    "term2": "sharper.a",
    "term2_lexname": "adj.all",
    "term2_synset": "sharp.a.08"
}
```

Example Procedures

The following discussion describes natural language techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the previous figures.

Figure 7:
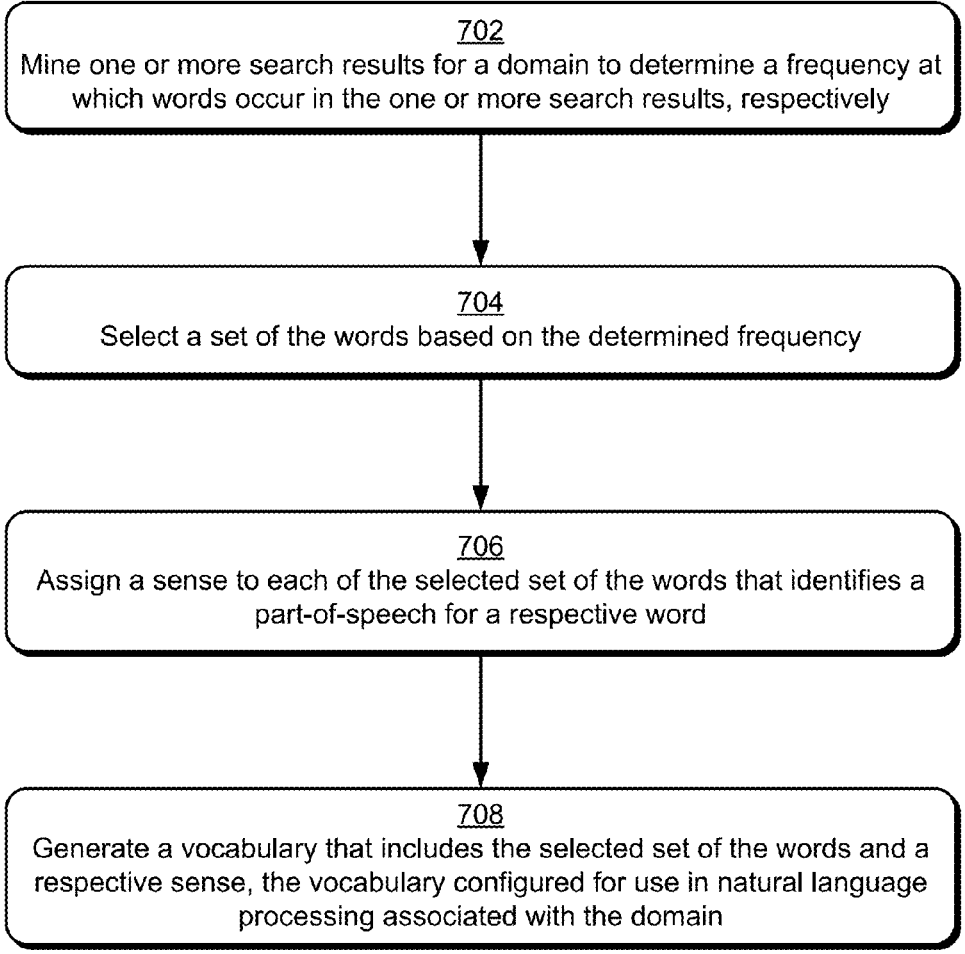
FIG. 7 is a flow diagram depicting a procedure in an example implementation in which a vocabulary is generated for use in natural language processing for a particular domain.

FIG. 7 depicts a procedure 700 in an example implementation in which a vocabulary is generated for use in natural language processing for a particular domain. One or more search results are mined for a domain to determine a frequency at which words occur in the one or more search results, respectively (block 702). The search results, for instance, may result from use of a search engine 202 in examining a corpus (e.g., web pages, tutorials, and so on) to generate search results 206. These search results 206 may then be mined to determine a frequency of words in the search results.

A set of the words is selected based on the determined frequency (block 704). Continuing with the previous example, a natural language processing module 116 may select an "x" number of words that are the most frequent in the search results, words having a frequency over a defined threshold, and so on.

A sense is assigned to each of the selected set of the words that identifies a part-of-speech for a respective word (block 706). The sense, for instance, may identify whether the word is like to be considered a noun, verb, adjective, or adverb for the domain. A vocabulary is then generated that includes the selected set of the words and a respective sense, the vocabulary configured for use in natural language processing associated with the domain (block 708). In this way, senses may be assigned to frequency used words in the domain to aid in disambiguation of the words in processing a natural language input, an example of which is described as follows.

Figure 8:
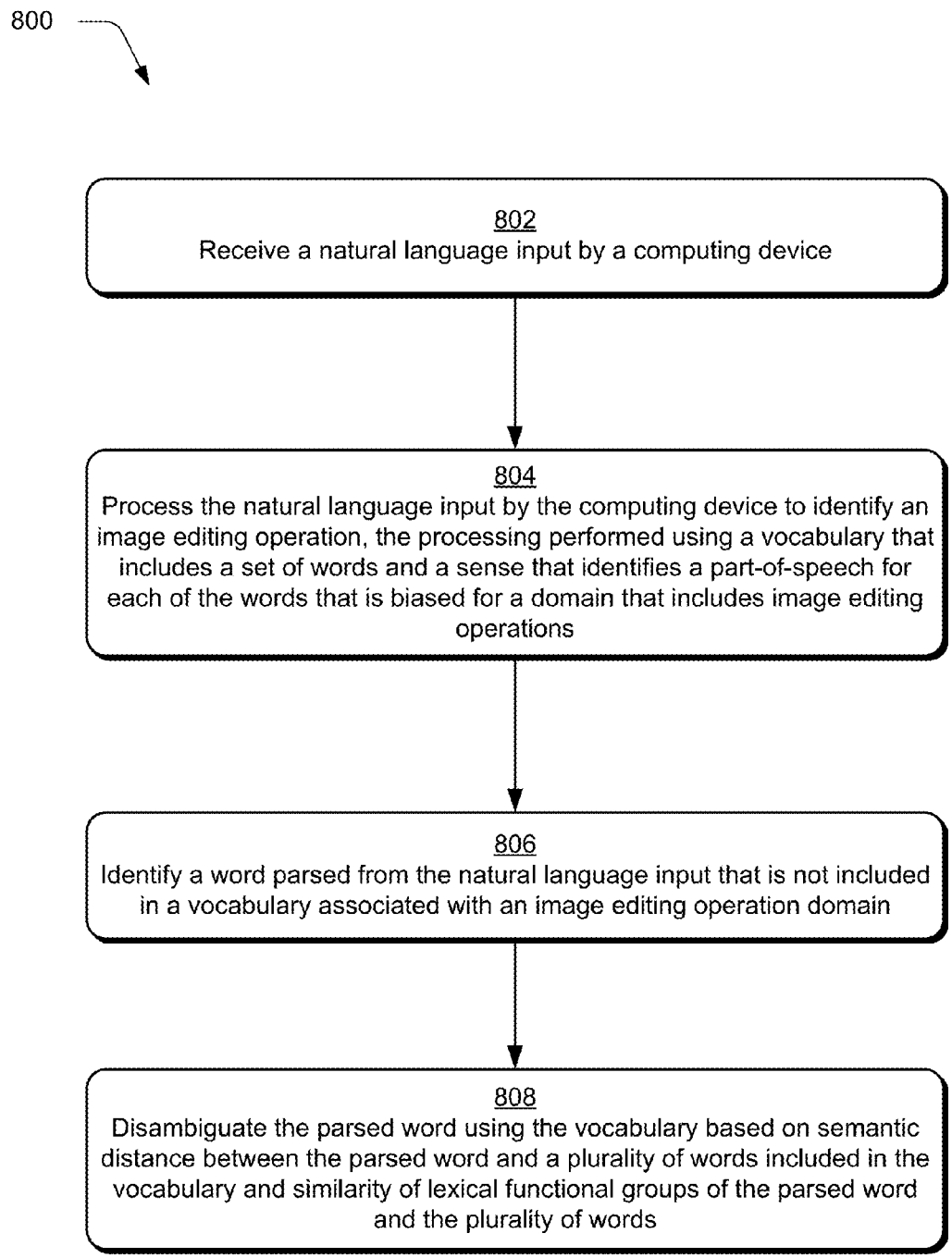
FIG. 8 is a flow diagram depicting a procedure in an example implementation in which a natural language input is processed using the vocabulary of FIG. 7.

FIG. 8 depicts a procedure 800 in an example implementation in which a natural language input is processed using the vocabulary of FIG. 7. A natural language input is received by a computing device (block 802). The natural language input, for instance, may originate from a speech input, manual entry by a user (e.g., writing on a touchscreen, manual typing), and so on.

The natural language input is processed by the computing device to identify an image editing operation, the processing performed using a vocabulary that includes a set of words and a sense that identifies a part-of-speech for each of the words that is biased for a domain that includes image editing operations (block 804). In this example, the domain is biased towards image editing. Accordingly, words in the vocabulary are assigned a sense that is particular for that domain, such as to use "crop" as a verb and not a noun. This processing may thus disambiguate between uses of the word and may even support use of a general natural language input, i.e., inputs that are not specifically included in a constrained vocabulary.

For example, a word may be identified that is parsed from the natural language input that is not included in a vocabulary associated with an image editing operation domain (block 806). The parsed word may then be disambiguated using the vocabulary based on sematic distance between the parsed word and a plurality of words included in the vocabulary and similarity of lexical functional groups of the parsed word and the plurality of words (block 808). In this way, words not included in the vocabulary may be mapped to similar words to determine a likely intent of the natural language input, e.g., an image editing operation, strength of the image editing operation, determination of where to perform the image editing operation, and so on.

Example System and Device

Figure 9:
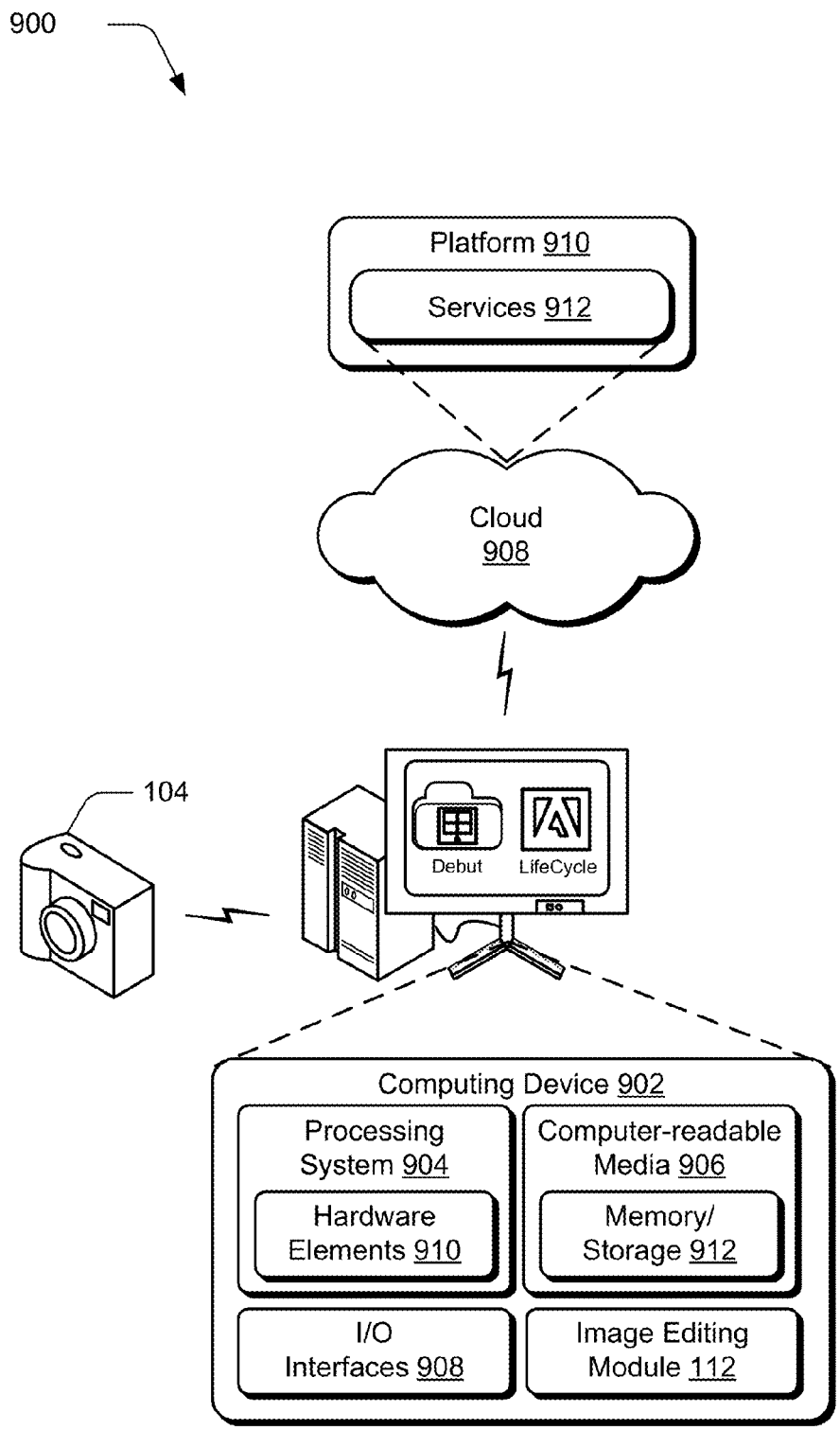
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the image editing module 112, which may be configured to edit image data, such as image data captured by an image capture device 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented at least partially in hardware of a computing device, the method comprising:
   mining, by the computing device, one or more search results returned from a search engine for a particular one of a plurality of domains to determine a frequency at which words occur in the one or more search results relating to the particular domain, respectively;
   selecting, by the computing device, a set of the words from the search results of the particular domain based on the determined frequency;
   assigning, by the computing device, a sense to each of the selected set of the words that identifies a part-of-speech for a respective said word, the sense based in part on the particular domain; and
   generating, by the computing device, a vocabulary for the particular domain that includes the selected set of the words and a respective said sense, the vocabulary describing a term sense bias as applied to a term semantic distance, the vocabulary configured for use in natural language processing to disambiguate natural language input according to the term sense bias applied to the term semantic distance of the particular domain.

2. A method as described in claim 1, wherein the one or more search results are generated such that the particular domain is used as part of a search query that is used to generate the one or more search results.

3. A method as described in claim 1, wherein the particular domain involves image editing operations.

4. A method as described in claim 1, wherein the mining of the one or more search results to determine the frequency is performed by building an N-gram tree in which a first said word that has a greater frequency of occurrence in the one or more search results than a second said word is disposed closer to a root of the N-gram tree than the second said word.

5. A method as described in claim 1, wherein the assigning of the sense is performed by examining one or more lexicon ontologies.

6. A method as described in claim 1, wherein the assigning of the sense is performed such that each of the selected set of the words is assigned to sense that is a noun, verb, adjective, or adverb.

7. A method as described in claim 1, wherein the vocabulary is generated such that the assigned sense to each of the selected set of the words is used to bias the vocabulary for the domain.

8. A method as described in claim 1, wherein the one or more search results include webpages involving a tutorial associated with the particular domain.

9. A method as described in claim 1, wherein the one or more search results are generated using a plurality of searches in which at least one of the searches is performed using word identified from a previous said search as part of a search query.

10. A method implemented at least partially in hardware of one or more computing devices, the method comprising:
   using a spreading activation algorithm, by the one or more computing devices, to generate a set of words relating to a particular one of a plurality of domains to determine which words are most frequently used in the particular domain;
   biasing, by the one or more computing devices, the set of words by assigning a sense based on one or more lexicon ontologies to each of the words that identifies a part-of-speech of a respective said word for the particular domain, the biasing configured to reflect a sense corresponding to how each of the words are used in the particular domain; and
   configuring, by the one or more computing devices, the set of words and the assigned sense for each of the words to form a vocabulary that is configured for use in natural language processing for the particular domain, the vocabulary describing the assigned sense bias for the particular domain as applied to a term semantic distance.

11. A method as described in claim 10, wherein the part-of-speech is a noun, verb, adjective, or adverb.

12. A method as described in claim 10, wherein the using of the spreading activation algorithm includes building an N-gram tree to represent frequency of occurrence of words in search results.

13. A method as described in claim 10, wherein the using of the spreading activation algorithm is performed such that the particular domain is used as part of a search query that is used to generate one or more search results that are used to derive the set of words.

14. A method as described in claim 13, wherein the one or more search results include web pages.

15. One or more computer-readable hardware storage media comprising instructions stored thereon that, responsive to execution by a computing device, causes the computing device to perform operations comprising:
   generating, at least partially in hardware of the computing device, a vocabulary for use in natural language processing for a particular one of a plurality of domains by:
      building an N-gram tree to represent frequency of occurrence of words in search results involving the particular domain, the search results obtained using a spreading activation algorithm constrained to the particular domain;
      selecting a set of the words based on the represented frequency of occurrence in the N-gram tree; and
      assigning a sense to each of the words in the set that identifies a part-of-speech of a respective said word, the sense reflecting, for each of the words, how each of the words are used in the particular domain of the plurality of domains.

16. One or more computer-readable hardware storage media as described in claim 15, wherein the assigning is performed using one or more lexicon ontologies.

17. One or more computer-readable hardware storage media as described in claim 15, wherein the spreading activation algorithm is constrained to the particular domain by including the particular domain in a search query used to perform a search that is used to generate the search results.

18. One or more computer-readable hardware storage media as described in claim 15, wherein the part-of-speech is a noun, verb, adjective, or adverb.

19. A method implemented at least partially in hardware of a computing device comprising:
   receiving a natural language input by the computing device;
   processing the natural language input by the computing device to identify an image editing operation, the processing performed using a vocabulary that includes a set of words and a sense that identifies a part-of-speech for each of the words that is biased for a domain that includes image editing operations, the natural language input not being part of the set of words of the vocabulary, the processing comprising disambiguating the natural language input according to a term sense bias applied to a term semantic distance, the term sense bias relating to the sense that identifies the part-of-speech for each of the words based on the domain that includes image editing operations; and
   performing the image editing operation by the computing device.

20. A method as described in claim 19, wherein the part-of-speech is a noun, verb, adjective, or adverb.

21. A method as described in claim 19, wherein the sense is determined based on one or more lexicon ontologies.

22. A method as described in claim 19, wherein the set of words included in the vocabulary is generated using a spreading activation algorithm.

23. A method as described in claim 22, wherein the spreading activation algorithm includes building an N-gram tree to represent frequency of occurrence of words in search results.

24. A method as described in claim 19, wherein the processing includes parsing the natural language input into words and finding a sense for each word that identifies a respective said part-of-speech for the natural language input.

25. A method as described in claim 24, wherein the term semantic distance is determined by computing semantic distances between the words in the natural language input and words included in the vocabulary, respectively.

26. A method as described in claim 24, wherein the processing is based at least in part on similarity of lexical functional groups of the words in the natural language input and the plurality of words included in the vocabulary, respectively.

27. A method as described in claim 19, wherein the natural language input is text processed from audio data using a speech-to-text engine.

28. A method as described in claim 19, wherein the processing includes filtering pairs of the parsed word and particular ones of the plurality of words in which a path that is usable to compute the semantic distance includes an ontology root.

29. A method implemented at least partially in hardware of one or more computing devices, the method comprising:
   identifying, by the one or more computing devices, a word parsed from a natural language input that is not included in a vocabulary associated with an image editing operation domain; and disambiguating, by the one or more computing devices, the parsed word using the vocabulary to identify non-matching words to accomplish image editing operations, the disambiguating based on:

semantic distance between the parsed word and a plurality of words included in the vocabulary, the semantic distance based at least in part on a distance matrix computed between the parsed word and one or more of the plurality of words included in the vocabulary, the distance matrix comprising semantic distances between terms for respective parts of speech; and similarity of lexical functional groups of the parsed word and the plurality of words.

30. A method as described in claim 29, wherein the lexical functional groups correspond to respective parts-of-speech.

31. A method as described in claim 30, wherein the parts-of-speech include nouns, verbs, adjectives, or adverbs.

32. A method as described in claim 29, wherein the similarity of the lexical functional groups is utilized in an instance in which the semantic distance between the parsed word and a first said word included in the vocabulary matches the semantic distance between the parsed word and a second said word included in the vocabulary.

33. A method as described in claim 29, wherein the word from the natural language input is not included in the vocabulary.

34. A method as described in claim 29, wherein the disambiguating includes filtering pairs of the parsed word and particular ones of the plurality of words in which a path that is usable to compute a semantic distance includes an ontology root.

35. One or more computer-readable hardware storage media comprising instructions stored thereon that, responsive to execution at least partially in hardware by a computing device, causes the computing device to perform operations comprising:

receiving a word via a natural language input, the received word not being included in an image editing operation vocabulary;

determining which of a plurality of words included in the image editing operation vocabulary is considered to be more similar to the received word than other said words in the image editing operation vocabulary, the determining based at least in part on:

semantic distance between the received word and a plurality of words included in the vocabulary, the semantic distance based at least in part on a distance matrix computed between the received word and one or more of the plurality of words included in the image editing operation vocabulary, the distance matrix comprising semantic distances between terms for respective parts of speech; and similarity of lexical functional groups of the received word and the plurality of words; and identifying an image editing operation based on the determining.

36. One or more computer-readable hardware storage media as described in claim 35, wherein the lexical functional groups correspond to respective parts-of-speech.

37. One or more computer-readable hardware storage media as described in claim 36, wherein the parts-of-speech include nouns, verbs, adjectives, or adverbs.

38. One or more computer-readable hardware storage media as described in claim 35, wherein the determining includes filtering pairs of the received word and particular ones of the plurality of words included in the image editing operation vocabulary in which a path that is usable to compute a semantic distance includes an ontology root.

* * * * *